UNITED STATES PATENT OFFICE.

JEPHTHA DANIEL CADY, OF QUANAH, TEXAS.

CEMENT PLASTER.

985,656.   Specification of Letters Patent.   Patented Feb. 28, 1911.

No Drawing.   Application filed April 27, 1909.   Serial No. 492,578.

*To all whom it may concern:*

Be it known that I, JEPHTHA DANIEL CADY, a citizen of the United States, residing at Quanah, in the county of Hardeman and State of Texas, have invented a new and useful Cement Plaster, of which the following is a specification.

It is the object of the present invention to disclose an improved method of manufacturing cement or plaster and the cement or plaster produced by the method to be hereinafter disclosed resembles that commonly known as "Keene's" cement in that it has a high degree of finish and is extremely hard when set.

It is a further object of the invention to disclose a method of manufacturing a cement of this general character which shall embody but few steps and which will necessitate the employment of but a minimum quantity of inexpensive chemicals.

In carrying out the invention, there is first selected a quantity of pure gypsum rock which should be of a quality practically free from magnesia and iron and this rock is broken into pieces of suitable size. After the rock has been broken into suitably sized pieces, it is placed in a kiln and is calcined in an oxidizing atmosphere to avoid reduction of any iron oxid present which would change the color of the product. After the calcining process has been completed, and the gypsum has cooled, it is crushed and ground to a fine powder and is set aside for further use, it being understood that this powder is anhydrous sulfate of calcium otherwise known commercially as hard plaster. Subsequent to this step in the process of manufacturing the cement, there is mixed one part of potassium hydroxid and three and a half parts of aluminum sulfate, together with sufficient water to dissolve the hydroxid and sulfate. This mixture of the potassium hydroxid and aluminum sulfate is placed in an iron pan and is heated to the boiling point and kept at this degree of temperature and stirred continuously until the mass becomes so inspissated as to preclude further stirring after which it is removed and dried either in a drying kiln or in the atmosphere. When thoroughly dried, the mass is broken into small bits and is ground to an impalpable powder.

It will be readily understood from the description of the second step in the process of manufacturing the cement, that upon mixing the potassium hydroxid and aluminum sulfate, a chemical reaction will take place, $$6KOH + Al_2(SO_4)_3 = Al_2(OH)_6 + 3K_2SO_4$$

the potassium taking over the sulfuric acid of the sulfate to form potassium sulfate and aluminum hydrate being at the same time formed.

It will be understood that in carrying out the second step of the process, the aluminum sulfate is in excess of the potassium hydroxid and for this reason, while the above reaction will take place and aluminum hydroxid and potassium sulfate will be formed, there will be mixed with these two resultants, an excess of aluminum sulfate. Thus, the mixture obtained by carrying out the second step of the process consists of aluminum hydroxid, potassium sulfate and aluminum sulfate.

After the foregoing steps of the process have been completed, there is added and intimately mixed with each ton of the ground calcined gypsum (anhydrous sulfate of calcium) forty pounds of the cement formed by mixing the potassium hydroxid and aluminum sulfate and consisting, owing to the chemical reaction which takes place as before described, of potassium sulfate and aluminum hydrate.

It will be found that a plaster composed of the ground calcined gypsum and the cement produced as heretofore stated, will set quickly and will have a smooth hard finish when it is set. In fact, such plaster will present all of the desirable qualities found in the "Keene's" cement or plaster of commerce.

What is claimed is:—

The herein described process of manufacturing cement plaster consisting in calcining gypsum rock in an oxidizing atmosphere whereby to produce anhydrous calcium sulfate without reduction, then mixing, in solution, one part of potassium hydroxid and three and one-half parts of aluminum sulfate, then treating and stirring this mixture until dry, and finally adding approximately forty pounds of the mixture to each part of the anhydrous calcium sulfate.

In testimony that I claim the foregoing as my own, I have hereto affixed my signature in the presence of two witnesses.

JEPHTHA DANIEL CADY.

Witnesses:
 J. C. FERGUSON,
 VASHTI NORWOOD.

Copies of this patent may be obtained for five cents each, by addressing the "Commissioner of Patents, Washington, D. C."